US008055015B2

(12) United States Patent
Bouzar

(10) Patent No.: US 8,055,015 B2
(45) Date of Patent: Nov. 8, 2011

(54) METHOD OF DETECTING AN INCIDENT OR THE LIKE ON A PORTION OF A ROUTE

(75) Inventor: Salah Bouzar, Sceaux (FR)

(73) Assignee: Citilog, Paris (FR)

( * ) Notice: Subject to any disclaimer, the term of this patent is extended or adjusted under 35 U.S.C. 154(b) by 996 days.

(21) Appl. No.: 10/521,606

(22) PCT Filed: Jul. 11, 2003

(86) PCT No.: PCT/FR03/02188

§ 371 (c)(1),
(2), (4) Date: Jan. 18, 2005

(87) PCT Pub. No.: WO2004/012168

PCT Pub. Date: Feb. 5, 2004

(65) Prior Publication Data

US 2005/0213791 A1 Sep. 29, 2005

(30) Foreign Application Priority Data

Jul. 22, 2002 (FR) ..................................... 02 09251

(51) Int. Cl.
*G06K 9/00* (2006.01)
*H04N 7/18* (2006.01)
*G08G 1/16* (2006.01)

(52) U.S. Cl. ......................... 382/103; 340/903; 348/149

(58) Field of Classification Search .................. 382/103, 382/104, 154; 340/903, 928, 933, 988; 701/117, 701/201; 348/148, 149, 164, 169
See application file for complete search history.

(56) References Cited

U.S. PATENT DOCUMENTS 4,847,772 A 7/1989 Michalopoulos et al.
5,296,852 A * 3/1994 Rathi ............................ 340/933
(Continued)

FOREIGN PATENT DOCUMENTS

WO WO 01/33503 A1 * 5/2001

OTHER PUBLICATIONS

Shuming et al, "Traffic Incident Detection Algorithm Based on Non-parameter Regression", Intelligent Transportation Systems, 2002. Proceedings. The IEEE 5th International Conference on Publication Date: 2002, on pp. 714-719.*

(Continued)

*Primary Examiner* — Gregory M Desire
*Assistant Examiner* — Andrae S Allison
(74) *Attorney, Agent, or Firm* — Young & Thompson

(57) ABSTRACT

A method for detecting an incident on a traffic lane uses a video camera having a target constituting an optoelectronic converter of a real optical image, the target being monitored by a programmable processing member and the incident detection process being designed to be carried out by activating the programmable processing member only when the real landscape image focused on the target is stationary. The inventive method includes detecting the beginning of displacement of the real image of the landscape relative to the target, in deactivating the programmable processing member right at the beginning of the displacement of the real image of the landscape relative to the target, and reactivating the programmable processing member at the end of the displacement of the real image of the landscape relative to the target to carry out the incident detection process.

18 Claims, 1 Drawing Sheet

U.S. PATENT DOCUMENTS

| | | | | |
|---|---|---|---|---|
| 5,396,283 | A * | 3/1995 | Taniguchi et al. | 348/149 |
| 5,422,673 | A * | 6/1995 | Kondo et al. | 348/352 |
| 5,774,569 | A * | 6/1998 | Waldenmaier | 382/100 |
| 5,798,793 | A * | 8/1998 | Tanaka | 348/347 |
| 5,912,634 | A * | 6/1999 | Bunnen et al. | 340/937 |
| 6,137,531 | A * | 10/2000 | Kanzaki et al. | 348/149 |
| 6,177,885 | B1 * | 1/2001 | Weil et al. | 701/117 |
| 6,188,778 | B1 * | 2/2001 | Higashikubo et al. | 382/104 |
| 6,470,261 | B1 * | 10/2002 | Ng et al. | 701/117 |

OTHER PUBLICATIONS

Kamijo et al, "Traffic Monitoring and Accident Detection at Intersections", IEEE Transactions on Intelligent Transportation Systems, vol. 1, No. 2, Jun. 2000.*

Kun-feng Wang; Xingwu Jia; Shuming Tang, "A survey of vision-based automatic incident detection technology," Vehicular Electronics and Safety, 2005. IEEE International Conference on , vol., No., pp. 290-295, Oct. 14-16, 2005.*

* cited by examiner

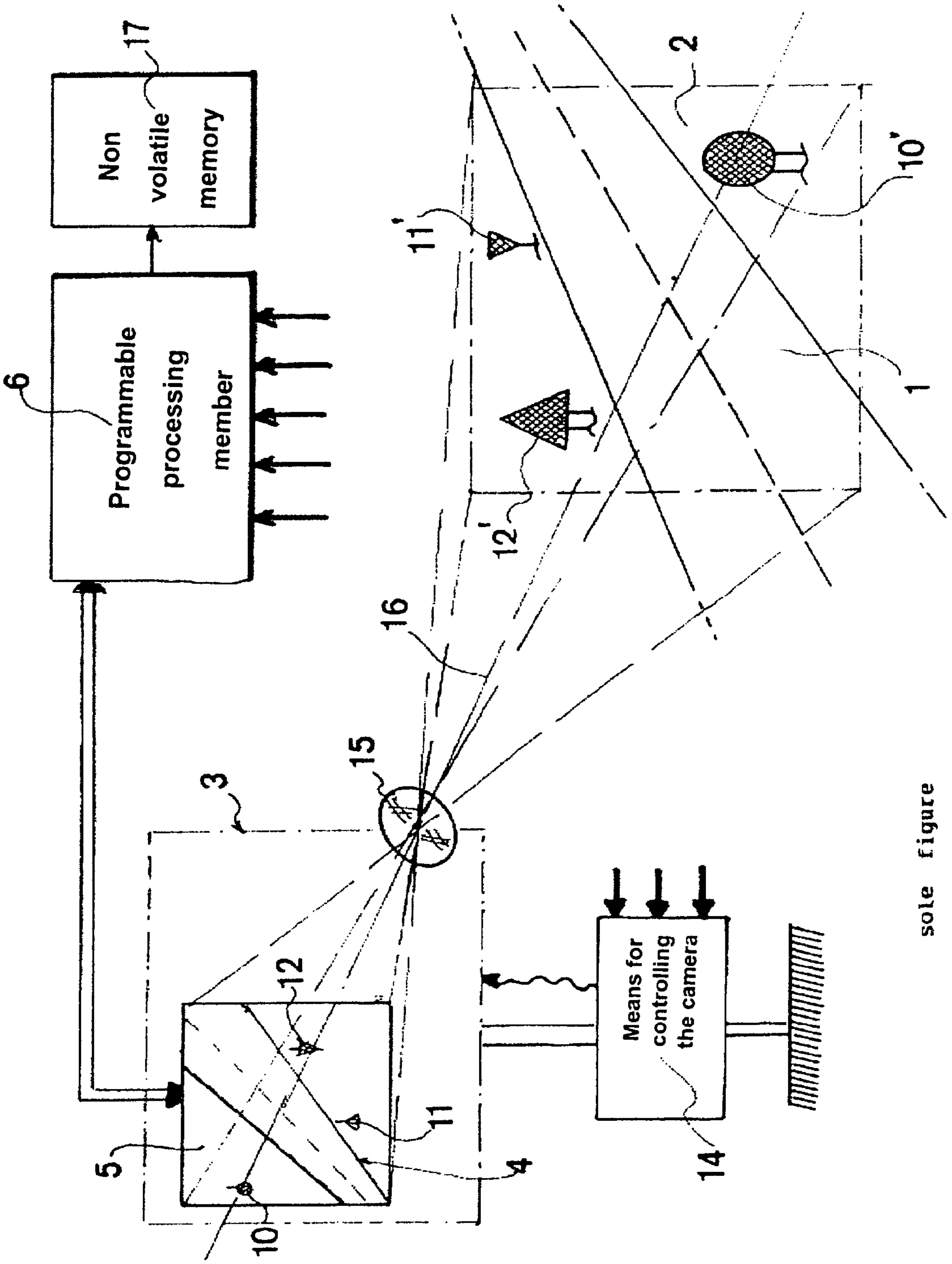
sole figure

METHOD OF DETECTING AN INCIDENT OR THE LIKE ON A PORTION OF A ROUTE

CROSS-REFERENCE TO RELATED APPLICATIONS

The present application is a National Stage and claims priority from PCT/FR03/02188 filed Jul. 11, 2003 which in turn claims priority from French Patent Application 02/09521 filed Jul. 22, 2003 each incorporated here by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

BACKGROUND OF THE INVENTION

1. Field of the Invention

The present invention relates to methods of detecting changes in the occupancy state of a portion of route suitable for being traveled along by objects following its axis in a given scene, e.g. for the purpose of evaluating variations in traffic density on the portion of route, methods which find a particularly advantageous application in the field of detecting incidents of any kind that might arise on the portion of route.

2. Description of the Related Art

Traffic, in particular motor vehicle traffic, has been increasing continuously over several years, and in certain circumstances, e.g. following an incident on the road used by such vehicles, congestion occurs which undoubtedly impedes traffic flow. Proposals have therefore been made to remedy such drawbacks by detecting any incident that occurs on a portion of route (in this case a portion of road) as quickly as possible after it has occurred, and then controlling and modulating vehicle traffic on said portion of road, and regardless of whether the portion of road is used by many vehicles (a traffic lane) or by few vehicles (emergency stop lane, a zebra zone, a refuge, etc.).

In order to be able to detect such incidents, it is necessary to provide sensors capable of giving an image of vehicle traffic on a portion of road. Numerous sensors have been developed. For example, a sensor has been devised comprising photosensitive receivers associated with light rays directed towards the roads along which vehicles are traveling and returned by reflecting surfaces disposed for this purpose on the roadways, with the photosensitive receivers outputting signals each time a vehicle interrupts the light beams.

That technique gives good results. However the signals delivered are representative of traffic at a determined point only, and the sensors used are not flexible in use, since they require elements to be applied to the roadway at locations that are well defined, and to ensure that said reflecting surfaces reflect continuously by also providing artificial illumination when the lighting of the scene is low. Such elements therefore cannot be moved without difficulty, and once they have been put into place, they require frequent intervention, if only to keep their reflecting surfaces clean.

Other sensors have been made for increasing the area under surveillance. This applies to a sensor constituted by a magnetic loop embedded in the roadway. Such a sensor mitigates some of the above-mentioned drawbacks, but it remains too geographically restricted in use, specifically because it remains associated with a determined location of the roadway and requires major roadworks for installation by sawing into the roadway.

A device has also been developed for implementing the method described in EP-A-0 277 050. In that method, a main real image is initially formed of the portion of road in a plane that forms a non-zero angle with said portion of road. This main image is then subdivided into a plurality of points, and the relationship is determined between the size of a unit length taken substantially at the portion of road and the size of its image formed in the main image, as a function of the number of points covered by the image and the location of the unit length on the portion of road. A secondary image is also determined in the main image, the secondary image corresponding to a longitudinal mark associated with the vehicle on the portion of road, the different successive positions of the secondary image being defined by correlations with the number of points covered by said secondary image, it being understood that said secondary image in said relationship corresponds to a constant length on the portion of road.

The device described in that prior document gives very good results and makes it possible to determine a very large number of parameters defining traffic density on a portion of road. Nevertheless, it is very expensive or too complex for certain applications, thereby restricting use thereof.

A simpler device has also been developed such as that described in U.S. Pat. No. 4,258,351. That device comprises a series of photosensitive cells distributed in the focal plane of a converging lens. Each cell is constituted by a strip, and each strip is designed so that its length is equal to the width of the image of the road formed by the lens. Said length thus complies with the perspective relationship for the road.

That technique presents the advantage of being easy to implement, but it also presents drawbacks: it requires an implementation for each road and only one signal is obtained by lines crossing the road, thus making the signals very difficult to interpret.

Other devices have been developed that give good results, constituted by a video camera having a target constituting an optoelectronic converter of an optical image, said target being controlled by a programmable processor member.

By way of example, such a device is described in FR-A-2 679 682, which discloses an implementation of a method enabling an incident to be detected on a portion of route situated in a scene when said portion of route is suitable for having objects traveling therealong.

Such a device presents advantages over the prior devices. In addition to being made out of elements that are commonly available, it enables the images of the portion of route under surveillance to be stored in a memory, where such images can be used subsequently, e.g. to determine the cause of an incident or the like that has occurred on said portion of route.

In addition, in order to be better aware of the nature and the immediate consequences of an incident, thus making it possible to study the cause thereof better, it is possible to modify at will the field of the objective lens of the camera when it is constituted by a zoom lens, and/or to modify the direction in which the optical axis of the camera is pointing by mounting the camera to co-operate with a pointer member so that the direction of its optical axis can be varied in elevation and in azimuth.

These facilities made possible by present video cameras are most advantageous for the operators of traffic routes, in particular roads, but they make it considerably more complicated to implement the method of the kind given in FR-A-2 679 682 for detecting an incident using the technique referred to as "AID".

The AID technique of Automatic Incident Detection on a portion of route can be implemented only if the image of the portion of route formed on the photosensitive target of the camera is stable for several seconds or even several minutes, which it the time needed by the processor member to execute the program for implementing the method. The method used in that technique requires a manual calibration stage on a stable image. In general, the camera is held stationary and said stage is performed when the device is put into operation. For example, maintenance operations on the camera make it necessary on each occasion to verify that the sensor is properly calibrated.

The method can therefore no longer be implemented when, for example, the direction of the optical axis of the camera changes in elevation and/or azimuth, and/or when the field of the objective lens of the camera is varied, e.g. by zooming into a particular area of the portion of route and/or the scene that includes said portion of route.

The present invention thus seeks to implement a method which makes it possible automatically to detect an incident that has occurred on a portion of route, e.g. using the AID technique described in FR-A-2 679 682, even when the field of the camera lens has been modified, e.g. by zooming, and/or when the direction of the optical axis of the camera has been changed in elevation and/or azimuth, and to do this without making it necessary for technicians to intervene manually after each such modification, for example, while also making it possible to use the devices for implementing prior art methods without needing to add additional hardware means thereto.

BRIEF SUMMARY OF THE INVENTION

The present invention provides a method of detecting an incident on a portion of route situated in a scene when said portion of route is suitable for having objects traveling therealong, and when the method makes use of a video camera having a target constituting an optoelectronic converter of a real optical image of the scene, said target being controlled by a programmable processor member, the process for detecting incidents being suitable for being performed by activating said programmable processor member only while the real image of the scene focused on the target is stationary, the method being characterized in that it consists:

- in detecting the beginning of movement of the real image of the scene relative to the target;
- in deactivating the programmable processor member as soon as the real image of the scene begins to move relative to the target;
- in detecting the end of movement of the real image of the scene relative to the target; and
- in reactivating the programmable processor member at the end of the movement of the real image of the scene relative to the target in order to implement the process for detecting an incident.

Other characteristics and advantages of the invention appear from the following description given with reference to the accompanying drawing by way of non-limiting illustration.

BRIEF DESCRIPTION OF THE DRAWINGS

The sole FIGURE is a block diagram of an embodiment of means for implementing the method of the invention, and also serves to explain the method.

DETAILED DESCRIPTION OF THE INVENTION

The present invention relates to a method of detecting an incident on a portion of route 1 situated in a scene 2 when said portion of route is suitable for having objects of any kind traveling therealong, in particular when it is a portion of road suitable for having motor vehicles traveling therealong.

The method is applied when a video camera 3 is used for implementing the method, the camera having a target 4 constituting an optoelectronic converter for converting a real optical image 5 of the scene 2, and when said camera is associated with means 14 for varying at will the field of the objective lens 15 of the camera when it is constituted by a zoom lens, and/or for changing the pointing direction of the optical axis 16 of the camera so that the direction of said optical axis can be controlled in elevation and in azimuth. These means 14 are themselves well known and are therefore not described in greater detail herein in order to simplify the present description.

The term "scene" is used to cover all of the elements of the scene in the field of view of the camera, and not only the portion of route.

In addition, the target is analyzed by a programmable processor member 6 such as a microprocessor or the like, optionally associated with a non-volatile memory 17 such as a video recorder or the like, with incidents on the portion of route 1 in the scene 2 being detectable on activating the programmable processor member 6 only when the real image 5 of the scene as focused on the target 4 is stationary.

The method of the invention thus consists in detecting the beginning of any displacement of the real image 5 of the scene 2 relative to the target 4, in deactivating the programmable processor member 6 as soon as the real image 5 of the scene begins to move relative to the target, then in detecting the end of the displacement of the real image of the scene relative to the target, and finally in reactivating the programmable processor member at the end of the displacement of the real image 5 of the scene relative to the target 4 in order to implement the incident detection process on the portion of route 1.

In an advantageous first implementation of the method, the beginning and the end of displacement of the real image of the scene relative to the target are detected by determining at least a first image point 10, 11, 12, . . . in said real image 5 of the scene 2 that corresponds to a fixed point 10', 11', 12', . . . in the scene, and in generating a first command signal when said first image point is subject to a change of position on the target 4, and then in controlling the programmable process member 6 as a function of said first command signal, i.e. initially deactivating the programmable processor member as soon as the real image starts to move, and subsequently reactivating the same programmable processor member at the end of the displacement of the real image so as to perform the iterative detection process using the technique that is itself known.

In a second advantageous implementation of the method, the beginning and the end of the displacement of the real image 5 of the scene 2 relative to the target are detected by determining at least second and third image points 10, 11, 12, . . . of the real image 5 of the scene 2 corresponding respectively to two stationary points 10', 11', 12', . . . of said scene, in generating a second command signal when the distance between said second and third image points is subjected to a variation, and subsequently controlling the programmable processor member 6 as a function of the second command signal, i.e. initially deactivating the programmable processor member as soon as the real image begins to move, and then reactivating the same programmable processor member at the end of movement of the real image in order to perform the incident detection process using the technique that is itself known.

In a third advantageous implementation of the method that will certainly be preferred over the two preceding implementations, the beginning and the end of movement of the real image of the scene relative to the target are detected initially by determining at least fourth and fifth image points 10, 11, 12, . . . of the real image 5 of the scene 2 corresponding respectively to two stationary points 10', 11', 12', . . . of the scene, in generating a third command signal when the distance between the fourth and fifth image points is subjected to a change, or when at least one of the fourth and fifth image points is subjected to a change of position on the target 4, and in controlling the programmable processor member 6 as a function of the third command signal, i.e. initially deactivating the programmable processor member as soon as the real image begins to move, and subsequently reactivating the same programmable processor member at the end of the movement of the real image so as to perform the incident detection process using the technique that is itself known.

It is specified that the above-defined command signals pass, for example, from a first state to a second state when the beginning of movement of the real image 5 is detected, and from the second state back to the first state when the end of movement of said real image is detected.

The programmable processor member 6 is deactivated throughout the period during which the command signal is in its second state.

For detecting incidents on a motor traffic road or the like, the stationary points 10', 11', 12', . . . in the scene 2 may be constituted, for example, by points that are dark (or particularly bright) on roadside signaling panels, lamp posts, or the like, portions of advertising panels, or even points that are particularly dark (or particularly bright) in given vegetation.

Detecting the beginning and the end either of movement of an image point of the real image 5 of the scene 2 relative to the target, or of variation in the distance between two image points, can easily be implemented, e.g. by means of the processor member 6 under the control of a suitable computer program adapted to implement the method of the invention, where writing such a program comes within the competence of the person skilled in the art who knows the above-explained method.

For easier and thus preferred implementation of the method, the target 4 is made up of a plurality of photosensitive points, these photosensitive points being suitable for delivering signals that are a function of the quantity of radiation received on their photosensitive surfaces. In addition, the received surfaces of the photosensitive points are advantageously of substantially the same dimensions. In fact, commercially available video cameras generally include such targets.

As mentioned above, an incident can be detected on the portion of route 1 by activating the programmable processor member 6 only while the real image 5 of the scene 2 that is focused on the target 4 is stationary.

When the programmable processor member 6 is activated, it is suitable for detecting incidents on the portion of route using various processes. An advantageous example of one such process for detecting incidents, referred to as "AID", is described and explained in FR-A-2 679 682, for example.

In outline, that process for detecting incidents consists in selecting a group of photosensitive points in the plurality of photosensitive points constituting the target 4, said selected group of points corresponding to points on the portion of route 1 that are located on a plurality of main geometrical construction lines situated on the plane of the portion of route 1 and extending substantially parallel to the substantially rectilinear axis of the path along which objects normally travel on the portion of route 1, and in analyzing the sets of signals delivered by the photosensitive points in the selected group.

This process for detecting an incident may also consist in subdividing the selected group of photosensitive points into a plurality of subgroups of photosensitive points corresponding to points on the portion of route situated at the intersections between the main construction lines and respective secondary geometrical construction lines extending substantially perpendicularly to the main construction lines, and in associating each photosensitive point of a subgroup with a weighting coefficient for multiplying the value of the signal emitted by said points, the weighting coefficients being a function of the preferential probability of objects passing on the point on the portion of route whose image is the photosensitive point associated with the weighting coefficient.

The above-mentioned analysis of the signals delivered by the photosensitive points can consist in averaging the values of the signals delivered at given instants by the points in each subgroup, and then for each subgroup in comparing the averages obtained in this way and in deducing from the comparison whether an incident, if any, is present on the portion of route.

The method of the invention as described and defined above can be explained as follows.

Firstly, it is stated that it is easy to define the address of an image point on the target of a video camera, particularly since said target is made up of a plurality of photosensitive points such as pixels or the like.

By analyzing said target using appropriate software that enables the method of the invention to be implemented, it is possible automatically to monitor the position of an image point on the target. If the image point is the image of a stationary point in the scene 2, then when the camera moves in elevation and/or azimuth, the image point will change its position. By tracking the changes in the position of the image point, it is thus possible to determine the beginning and the end of movement of the real image of the scene 2 relative to the target, and to deactivate the processor member until the position of the image point has become stationary again.

When the image becomes stable again, i.e. when the image point is analyzed as being stationary relative to the target, the processor member 6 again runs the process for detecting incidents using the AID type method as defined above.

Similarly, when the scene 2 is zoomed in or zoomed out, the image on the target will respectively become larger or smaller, and the same will therefore apply to the distance between two image points.

In the same manner as described above, it is possible to determine the beginning and the end of a zoom operation, and while it is taking place, to deactivate the processor member at least in part, with the portion that remains active serving, for example, to watch for a return to stability.

Once the image has become stable again for a certain length of time as determined by the person skilled in the art, i.e. once two image points are analyzed as remaining at a constant distance apart, i.e. once their respective addresses have become stationary again, the processor member 6 again runs the process for detecting incidents using the AID method as defined above.

The above-described method is described using one image point for determining whether the camera is moving in elevation and/or azimuth, and two image points for detecting whether it is zooming in or zooming out. However, in the application to detecting an incident on a portion of road for motor traffic or the like, it is advantageous to use a larger number of image points so as to be as certain as possible of detecting automatically any movement of the camera whether in elevation or in azimuth, and/or any zoom action. For example, it is not impossible for the position of an image point to be considered as stationary prior to a movement and for its position to be unsuitable for being considered as stationary at the end of the movement, merely because the image point then belongs to the image of a vehicle moving along the portion of road 1.

Thus, in order to lift this possible ambiguity, detecting the beginning and the end of movement of the real image of the scene relative to the target advantageously consists in defining a plurality of image points of the real image of the scene corresponding to a plurality of points that are stationary at the beginning of movement of the real image, in generating a fourth command signal when some determined number of said plurality of image points have become stationary again at the end of movement of the real image, and in controlling the programmable processor member as a function of said fourth command signal, i.e. initially deactivating the programmable processor member as soon as the real image begins to move, and subsequently reactivating the same programmable processor member at the end of movement of the real image in order to implement the process for detecting an incident using the technique that is itself known.

The person skilled in the art knows how to determine the optimum quantity of image points to be used, and amongst said optimum quantity of image points, how to determine the number of stable image points that should be taken into account.

From the description given above, it can clearly be seen that the method can be implemented without manual intervention on the part of technicians every time there is a change in the pointing direction of the optical axis of the camera in elevation and/or azimuth, and/or every time there is a change in the field angle of its objective lens, while making use of the same devices as are used for implementing prior art methods, and without it being necessary to add additional hardware means thereto.

In order to implement the method of the present invention, it suffices in conventional manner to load software adapted to the method into the programmable processor member, it being understood that writing such software comes within the competence of the person skilled in the art, as mentioned above.

The invention claimed is:

1. A method of detecting an incident on a portion of route situated in a scene said portion of route is suitable for having objects travelling therealong, and the method using a video camera controllable in one of azimuth, elevation and field of view and having a target constituting an optoelectronic converter of a real optical image of the scene, said target being controlled by a programmable processor member, said process detecting incidents comprising:

A) having said programmable processing member determine that said video camera is substantially stationary in relation to said scene by
 i) selecting at least one point on a current real image of said scene, outside of said portion of said route;
 ii) comparing said at least one point on said current real image with said at least one point on at least one of a set of immediate previous targets of a stored image;
 iii) determining that said at least one point is approximately at the same position in said current real image as in at least one of the set of immediate previous targets of the stored image;
 iv)a) upon failure to determine the same position in step iii, re-execute steps i) through iii) with at least one other point; and
 iv)b) upon determining the same position in step iii), proceed to step B)

B) having said programmable processor member process said current real images to detect incidents.

2. The method according to claim 1, wherein the real image of the scene beginning to move relative to the target occurs upon the beginning of a zooming in function or a zooming out function of the real image.

3. The method according to claim 1, wherein the end of the movement of the real image of the scene relative to the target occurs upon an end of a zooming in function or a zooming out function of the real image.

4. The method of claim 1, wherein the programmable processor member is deactivated as soon as the stationarity of the scene relative to the target is detected as ending, and reactivated, in order to implement the process for detecting an incident, as soon as said stationarity of the scene relative to the target is detected as beginning.

5. The method of claim 4, wherein said beginning and ending of said stationarity of the scene relative to the target are detected by determining at least one first image point of said real image of the scene corresponding to a stationary point of said scene, substantially outside said portion of said route, by generating a first command signal when said first image point is subjected to a change of position of said target, and by controlling said programmable processor member as a function of said first command signal.

6. The method of claim 5, wherein beginning and ending of said stationarity of the scene relative to the target are detected by determining at least one second and one third image points of said real image of the scene corresponding respectively to two stationary points of said scene, substantially outside said portion of said route, by generating a second command signal when distance between said second and third image points changes, and by controlling said programmable processor member as a function of said second command signal.

7. The method of claim 6, wherein said beginning and ending of stationarity of the scene relative to the target are detected by determining at least one fourth and on fifth image points of said real image of the scene corresponding respectively to two stationary points of said scene, substantially outside said portion of said route, by generating a third command signal when distance between said fourth and fifth image points changes, and by controlling said programmable processor member as a function of said third command signal.

8. The method of claim 7, wherein said beginning and ending of stationarity of the scene relative to the target are detected by determining a plurality of image points of said real image of the scene corresponding to a plurality of points which are stationary at the beginning of movement of said real image of the scene and substantially on said portion of the route, by generating a fourth command signal when a determined number of said plurality of image points have become stationary again at the end of movement of said real image of the scene, and by controlling said programmable processor member as a function of said fourth command signal.

9. The method of claim 5, wherein said target is subdivided into a plurality of photosensitive points suitable for delivering signals as a function of the quantity of radiation received by their photosensitive surfaces.

10. The method of claim 6, wherein said target is subdivided into a plurality of photosensitive points suitable for delivering signals as a function of the quantity of radiation received by their photosensitive surfaces.

11. The method of claim 7, wherein said target is subdivided into a plurality of photosensitive points suitable for delivering signals as a function of the quantity of radiation received by their photosensitive surfaces.

12. The method of claim 1, wherein said target is subdivided into a plurality of photosensitive points suitable for delivering signals as a function of the quantity of radiation received by their photosensitive surfaces.

13. The method of claim 12, wherein the process for detecting an incident on said portion of route when it is suitable for having objects traveling thereon along an axis and following a path that is substantially imposed, comprises:

in selecting a group of photosensitive points in said plurality of photosensitive points of the target, the selected group of points corresponding to points of said portion of route located on a plurality of main geometrical construction lines, said main construction lines being situated in the plane of said portion of route and all being substantially parallel to the axis of said trajectory; and in analyzing the set of signals delivered by the photosensitive points of said selected group.

14. The method of claim 13, wherein the detection process further comprises:

in subdividing said selected group of photosensitive points into a plurality of subgroups of photosensitive points corresponding to points on the portion of route situated at the intersections between said main construction lines and respective secondary geometrical construction lines that are substantially perpendicular to the main construction line; and in associating each photosensitive point of a subgroup with a weighting coefficient for multiplying the value of the signal emitted by said point, the weighting coefficient being a function of the preferential probability of objects passing over the point of the portion of route whose image is the photosensitive point associated with said weighting coefficient.

15. The method of claim 14, wherein the photosensitive receive areas of said photosensitive points are of substantially the same dimensions.

16. The method of claim 15, wherein said analysis further comprises:

averaging the values of the signals delivered by the points of each subgroup at given instants;

comparing the averages as obtained in this way for each subgroup; and deducing from said comparison the presence, if any, of an incident on said portion of route.

17. An automatic road traffic incident detection system comprising at least one video camera with an optical axis controllable in azimuth, elevation and focal distance, said camera being positioned alongside said road and fit for taking real images of scenes of the road and converting them into target images which are submitted as an entry to a computer process to detect traffic incidents, said computer process being deactivated by a programmable processing member based on detection of movement of the at least one video camera by the ending of stationarity of said target images relative to said real images of scenes and being reactivated based on detection of lack of movement of the at least one video camera by the beginning of stationarity of said target images relative to real images of scenes, wherein said ending and beginning of stationarity of said target images relative to said real images of scenes are detected by selecting at least one point on a current real image of said scenes, outside of said portion of said route, comparing said point on said current real image with said point on at least one of a set of immediate previous targets of a stored image, determining that stationarity begins upon said point being approximately at the same position in said current real image and said set of immediate previous targets of a stored image relative to said scene and that stationarity ends upon said point not being in the same position in said current real image and said set of immediate previous targets relative to said scene.

18. A system for detecting an incident in the flow of traffic, comprising:

a camera with an optical axis controllable in azimuth, elevation and focal distance for taking images of roadside scenes and transmitting them for determination of a roadside incident; and a programmable processor programmed to detect the roadside incident from images received from the camera, wherein the programmed processor detects when the roadside incident processing ends based upon a determination that the camera is moving relative to a scene, the determination of camera movement based upon changing points in a current live image relative to a set of previous images, the programmed processor detects the roadside incident processing begins based upon a determination that the camera is stationary relative to the scene, the determination of camera movement based upon points remaining fixed in the current live image relative to the set of previous images.

* * * * *